T. W. ASH.
SAFETY AIR BRAKE APPLIANCE.
APPLICATION FILED SEPT. 14, 1909.

941,295.

Patented Nov. 23, 1909.

Witnesses
F. P. Dederick.
W. L. Brown.

Inventor
Thomas W. Ash.
By F. P. Dederick.
Attorney

UNITED STATES PATENT OFFICE.

THOMAS W. ASH, OF SHERMAN, TEXAS.

SAFETY AIR-BRAKE APPLIANCE.

941,295.    Specification of Letters Patent.    Patented Nov. 23, 1909.

Application filed September 14, 1909.   Serial No. 517,754.

*To all whom it may concern:*

Be it known that I, THOMAS W. ASH, a citizen of the United States, residing at Sherman, in the county of Grayson and State of Texas, have invented certain new and useful Improvements in Safety Air-Brake Appliances, of which the following is a specification.

My invention relates to a safety air brake appliance for steam, traction, or other railways; the object being to provide a device for each car which will automatically and instantly apply the ordinary air brakes with which most cars are now equipped, to the whole train, the moment a single truck, for any cause leaves the rails.

By my invention the brakes are only automatically applied in case a truck leaves the track, and they are then actuated by substantially the same means as ordinarily when under manual control; which is by allowing air to escape from the train-line, thus reducing the pressure in the air cylinders connected with the brake mechanism. Obviously the usual means under the control of the train men to operate the brakes independently will not be interfered with by this emergency, automatic brake actuating mechanism.

Figure 1:
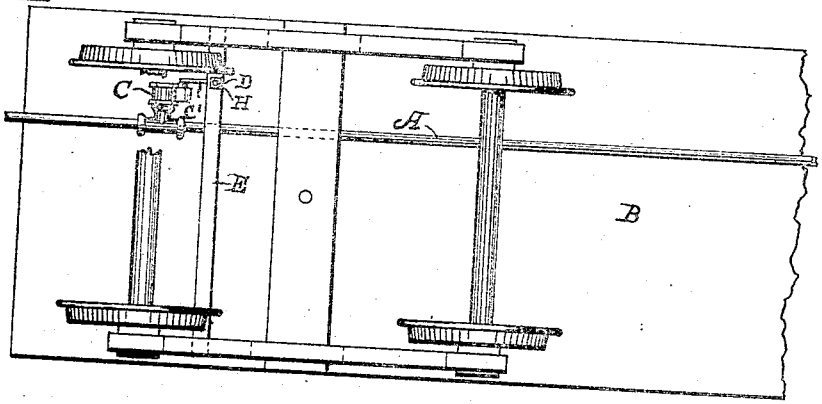
Figure 2:
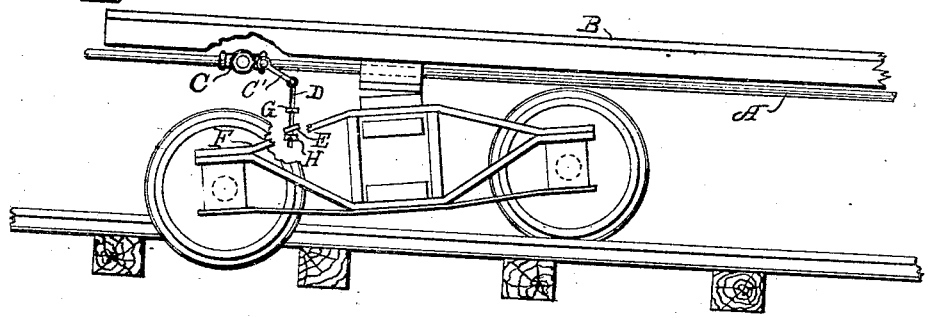

In the accompanying drawings: Figure 1 is a bottom plan view, and Fig. 2 is a side elevation of a car showing the application of the invention.

The car is shown divested of all parts which would tend to confuse and render obscure the application of the invention; and such parts only are shown which are essential to properly illustrate the improvement. The air and friction brake system and connections may be of ordinary well-known type and needs no description.

The train line-pipe A located and secured beneath the car body B, in addition to the usual fittings is provided with an auxiliary lever air-valve C, and at the outer end of its lever C¹ is pivoted a rod D, which extends downward and through a perforation in a transverse bar E that is connected near its ends, to the top bars F of the truck frames. The lower end of the rod D is threaded for a considerable distance and provided with nuts G and H, placed respectively above and below the bar E enabling the adjustment of the rod to a position admitting of the ordinary vertical movement of the car when empty or loaded, without moving the valve lever, but so it will draw the lever down, thus opening the valve and permit the escape of air from the train line should the wheels leave the track as shown in Fig. 2.

The operation of the invention is as follows: Under normal conditions the valve C remains closed, leaving the usual air-brake system to be operated by the train men. This condition exists so long as all the car trucks remain on the track, but when by accident a truck leaves the rails, as shown in Fig. 2, the auxiliary valve C will be opened by the downward plunge of the car truck, permitting the escape of air from the train-line, which instantly and automatically applies all of the car brakes and brings the train to a standstill.

From the foregoing it is thought that the construction, operation, and many advantages of the herein-described invention will be apparent to those skilled in the art without further description, and it will be understood that minor changes in the location of the parts, proportion, and details of construction may be resorted to without departing from the spirit or sacrificing any of the advantages of the invention.

Having thus described my invention, what I esteem as new, and desire to secure by Letters Patent of the United States, is—

In a safety air brake appliance for cars, an auxiliary air-valve attached to the train line of a car, a perforated transverse bar secured to the top frame of a car truck, a vertical rod extending through the perforation, the upper end being connected to the valve-lever and the lower end threaded and provided with an adjusting nut above and beneath the transverse bar substantially as described.

In testimony whereof I affix my signature in presence of two witnesses.

THOMAS W. ASH.

Witnesses:
Z. P. DEDERICK,
W. L. BROWN.